United States Patent Office

Re. 24,819
Reissued May 3, 1960

24,819

SILVER POLISH

James G. Murphy, Bethesda, Md.

No Drawing. Original No. 2,841,501, dated July 1, 1958, Serial No. 653,290, April 17, 1957. Application for reissue May 14, 1959, Serial No. 813,323

9 Claims. (Cl. 148—6.24)

Matter enclosed in heavy brackets [ ] appears in the original patent but forms no part of this reissue specification; matter printed in italics indicates the additions made by reissue.

This invention relates to a silver polish; more particularly, this invention relates to a composition containing a mild abrasive and an anti-tarnish agent whereby silver, when polished, is protected against subsequent tarnishing.

Ordinarily when tarnish is removed from a silver service by polishing the silver, the resulting cleaned silver amounts to a bright chemically active metallic surface all the more subject to renewed corrosion or tarnishing just as soon as the polishing composition has been removed. The silver service retarnishes with a rapidity which never fails to amaze the housewife. The polishing operation must be repeated again and again with distressing frequency.

The object of the instant invention is to provide a polishing composition which will protect the silver against retarnishing by leaving behind a thin, transparent film on the surface of the silver capable of protecting the underlying metal from tarnishing.

The compositions contemplated by the instant invention include a finely divided abrasive polishing agent such as chalk, silica, alumina. The abrasive may be natural or synthetic; abrasive mixtures may be employed. The abrasive per se forms no part of the invention, and any powdery material capable of polishing silver may be employed in the anti-tarnish silver polish. Thus, for example, the solid powders enumerated in Patent 2,205,115 are suitable as the abrasive component of the compositions herein contemplated.

The anti-tarnish component of the polish are compounds having the formula R—S—H where R is a $C_{12-20}$ straight chain alkyl radical. The abarsive and the n-alkane thiol are the essential components. If desired, other materials may be added to the polish such as suspending agent, odorizer and solvent diluents, in order to provide a properly balanced packaged composition for the housewife's use.

In the course of use to polish silver, the abrasive in the polishing composition abrades the tarnish (oxides, sulfides, etc.) from the surface of the silver exposing a clean metal substratum. Without being bound thereto, applicant theorizes that once the metallic substratum is exposed, the thiol reacts with the metal to form a metallo-organic compound linked through the sulphur, i.e., Ag—S—R, where R is the straight chain $C_{12-20}$ alkyl radical. This chemical reaction apparently occurs as rapidly as the polishing action of the abrasive exposes clean metal. By the time the silver piece has been completely polished, reacted thiol has covered the entire surface. After the polishing composition has been washed off, a monomolecular layer of R—S—Ag reaction product remains on the surface with the alkyl chains R upstanding therefrom packed tightly together, by secondary valence forces. The arrangement is akin to the monomolecular layer formed by a droplet of fatty acid placed on water where the carboxyl groups at the end of each molecule orients to the water surface, and the alkyl chains orient perpendicularly up from the water. The secondary valence forces pack the fatty acid molecules together with sufficient cohesion to retain its identity as a film on the surface of the water.

At any rate the alkyl chains of the film form a hydrophobic physical barrier between the silver and the reactive ingredients of the atmosphere and whatever liquids the silver piece contacts during normal use. The chemical bond at the surface of the silver holds the layer on tenaciously. Washing with detergent solutions, with dilute alkaline solutions, with dilute acid or with solvent solutions fail to dislodge the protective film. In normal household use the repeated washings to which silver pieces are subjected fail to dislodge or destroy this protective film for an extended period. Consequently a single application results in protection which can last for several months.

Since appearance of silver is important to the housewife, an important advantage of the polishing composition resides in the substantially invisible nature of the resulting protective film. The transparent film is unnoticeable and allows the beauty of the silver to shine through the film with an unimpaired brilliance. Presence of the film can, however, be detected by its hydrophobic nature. Thus water will not wet the protected silver surface; instead discrete droplets will form on the surface.

Because reliance is had upon secondary valence forces to help produce the desired protection, thiols with straight chain alkyl radicals are better than branched chain, or olefinic radicals of the same size, or aromatic radicals. The same undesirability holds true for secondary thiols. It has been found that primary thiols with straight chain alkyl groups less than twelve carbons in length are not as desirable because their greater volatility makes them more difficult to formulate with the abrasive and result in less permanent protection. Similarly primary thiols with straight chain alkyl radicals longer than the twenty carbon are difficult to mix with the abarsive because they are waxy to solid materials. It is advantageous that the n-alkane-1-thiols in the $C_{20-12}$ alkyl range may be prepared from the abundant supply of naturally occurring fats and oils. These $C_{12-20}$ thiols range in properties from a liquid to a waxy material depending of course on the length of the alkyl chain. In general they have a mild odor which, if desired, can be masked by incorporating a suitable odorizer into the polish composition. They are non-toxic, particularly when considering the extremely minute quantities that could possibly be ingested off a chemically bound monomolecular film on, for example, a silver teaspoon.

Still other ingredients such as solvent and suspending agents may be added to the thiol and the abrasive besides the odorizer without in any way affecting the essential cooperation of abrasive and thiol. The addition of such other components as will suggest themselves to workers in the art are considered to come within the contemplation of this invention.

The silver polish may be compounded within the following general ranges: 5 to 98% abrasive, 2 to 40% thiol, 0 to 10% odorizer, 0 to 1% suspending agent. The balance of the composition may be a diluent such as water or a $C_1$ to $C_3$ alcohol.

The following examples illustrate the manner in which a silver polish may be formulated and employed as well as its effectiveness in preventing the tarnishing of silver objects which would otherwise occur.

EXAMPLE I

Five grams of n-hexadecane-1-thiol, five grams of methyl salicylate, fifteen grams of precipitated chalk, and twenty-five grams of isopropanol were combined. This fluid mixture was used to treat one-half of a silver tray (the other half remaining as control). After forty-eight days' exposure to household atmosphere, the untreated half tarnished while the treated half did not.

EXAMPLE II

Sixty-nine milliliters of water, twenty grams of infusorial earth, five grams of n-dodecane-1-thiol, five grams of methyl salicylate, and one gram of methyl cellulose (4,000 centipoise grade) were combined. The resulting pasty mixture was applied to part of a sheet of silver. The treated area did not tarnish when exposed to a dilute solution of aqueous sodium sulfhydrate whereas the untreated area when similarly exposed rapidly tarnished.

EXAMPLE III

Five grams of n-octadecane-1-thiol were melted and mixed with five grams of methyl salicylate. The resulting fluid was added to fifteen grame of precipitated chalk and seventy-five grams of denatured alcohol.

This mixture was used to polish one-half of a silver tray (the remaining half serving as control). After forty-eight days' exposure to household atmosphere the untreated half had developed a deep tarnish while the treated half had only a very light tarnish.

EXAMPLE IV

Twenty-four and one-half grams of precipitated chalk was intimately mixed with one-half gram of n-dodecane-1-thiol. The resultant mixture was a loose white powder.

A silver tray was rubbed with the above polishing powder. On exposure of the treated tray to a dilute aqueous solution of sodium sulfhydrate, no tarnishing occurred. By contrast, exposure of the same tray to the sulfide solution before treatment produced rapid tarnishing.

What is claimed is:

1. A silver polish consisting essentially of a mixture of abrasive powder and an n-alkane-1-thiol, the alkane being a $C_{12-20}$ straight chain radical.

2. A silver polish consisting essentially of from 2 to 40% by weight of $C_{12-20}$ straight chain alkyl primary thiol and at least 5% by weight of an abrasive powder.

3. A silver polish in the following proportions: 5 to 98% by weight of a powdery abrasive, 2 to 40% by weight of a $C_{12-20}$ straight chain alkyl primary thiol, 0 to 10% of an odorizer, 0 to 1% of a suspending agent and from 0 to 93% of a volatile liquid diluent.

4. A silver polish consisting essentially of by weight 5 parts of n-hexadecane-1-thiol, 5 parts of methyl salicylate, 15 parts of precipitated chalk and 25 parts of isopropanol.

*5. An article having a silver surface which contains thereon a film of an n-alkane-1-thiol in which the alkane is a $C_{12-20}$ straight chain radical whereby said silver surface is rendered tarnish resistant.*

*6. An article having a silver surface which contains thereon a film of a $C_{12-20}$ straight chain alkyl primary thiol whereby said silver surface is rendered tarnish resistant.*

*7. An article having a silver surface which contains thereon a film of n-hexadecane-1-thiol whereby said silver surface is rendered tarnish resistant.*

*8. An article having a silver surface which contains thereon a film of n-dodecane-1-thiol whereby said surface is rendered tarnish resistant.*

*9. An article having a silver surface which contains thereon a film of n-octadecane-1-thiol whereby said surface is rendered tarnish resistant.*

References Cited in the file of this patent or the original patent

UNITED STATES PATENTS

| | | |
|---|---|---|
| 2,371,207 | Zublin | Mar. 13, 1945 |
| 2,491,066 | Wasson et al. | Dec. 13, 1949 |
| 2,691,593 | Avedikian | Oct. 12, 1954 |
| 2,809,138 | Wagner et al. | Oct. 8, 1957 |